United States Patent
Brothers et al.

(10) Patent No.: US 7,320,730 B2
(45) Date of Patent: *Jan. 22, 2008

(54) SUBTERRANEAN FLUIDS AND METHODS OF USING THESE FLUIDS IN SUBTERRANEAN FORMATIONS

(75) Inventors: Lance E. Brothers, Chickasha, OK (US); Anthony V. Palmer, Ardmore, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/500,097

(22) Filed: Aug. 7, 2006

(65) Prior Publication Data

US 2006/0270564 A1 Nov. 30, 2006

Related U.S. Application Data

(62) Division of application No. 10/639,702, filed on Aug. 12, 2003, now Pat. No. 7,147,056.

(51) Int. Cl.
*C04B 24/12* (2006.01)

(52) U.S. Cl. .............. 106/727; 106/705; 106/718; 106/724; 106/823

(58) Field of Classification Search ............. 106/705, 106/724, 727, 823, 718
See application file for complete search history.

(56) References Cited

U.S. PATENT DOCUMENTS

| | | | |
|---|---|---|---|
| 3,533,828 A * | 10/1970 | Rowe | |
| 4,126,003 A * | 11/1978 | Tomic | 405/261 |
| 4,618,369 A * | 10/1986 | Smith Johannsen | |
| 5,295,543 A | 3/1994 | Terry et al. | |
| 5,327,968 A | 7/1994 | Onan et al. | |
| 5,355,954 A | 10/1994 | Onan et al. | |
| 5,372,641 A | 12/1994 | Carpenter | |
| 5,383,521 A | 1/1995 | Onan et al. | |
| 5,389,145 A * | 2/1995 | Gupta et al. | 106/807 |
| 5,392,852 A | 2/1995 | Laurel et al. | |
| 5,398,758 A | 3/1995 | Onan et al. | |
| 5,711,383 A | 1/1998 | Terry et al. | |
| 5,913,364 A | 6/1999 | Sweatman | |
| 5,935,444 A | 8/1999 | Johnson et al. | |
| 6,024,170 A | 2/2000 | McCabe et al. | |
| 6,060,434 A | 5/2000 | Sweatman et al. | |
| 6,077,888 A | 6/2000 | Schilling | |
| 6,138,759 A | 10/2000 | Chatterji et al. | |
| 6,167,967 B1 | 1/2001 | Sweatman | |
| 6,187,719 B1 | 2/2001 | Dino et al. | |
| 6,204,224 B1 | 3/2001 | Quintero et al. | |
| 6,235,201 B1 | 5/2001 | Smith et al. | |
| 6,258,757 B1 | 7/2001 | Sweatman et al. | |
| 6,315,042 B1 | 11/2001 | Griffith et al. | |
| 6,352,952 B1 * | 3/2002 | Jardine et al. | |
| 6,524,384 B2 | 2/2003 | Griffith et al. | |
| 6,666,268 B2 | 12/2003 | Griffith et al. | |
| 6,668,929 B2 | 12/2003 | Griffith et al. | |
| 6,689,208 B1 | 2/2004 | Brothers | |
| 6,716,282 B2 | 4/2004 | Griffith et al. | |
| 6,815,399 B1 * | 11/2004 | Johnson et al. | 507/211 |
| 6,845,820 B1 | 1/2005 | Hebert et al. | |
| 7,199,086 B1 * | 4/2007 | Roddy et al. | 507/269 |
| 2002/0035041 A1 | 3/2002 | Griffith et al. | |
| 2003/0116065 A1 | 6/2003 | Griffith et al. | |
| 2003/0121456 A1 | 7/2003 | Griffith et al. | |
| 2003/0121660 A1 | 7/2003 | Griffith et al. | |
| 2005/0034867 A1 | 2/2005 | Griffith et al. | |

FOREIGN PATENT DOCUMENTS

| | | |
|---|---|---|
| EP | 1 138 740 A1 | 10/2001 |
| GB | 2 329 657 A | 3/1999 |
| GB | 2 342 671 A | 4/2000 |

OTHER PUBLICATIONS

Foreign communication from a related counterpart application dated Dec. 27, 2005.
Office action from U.S. Appl. No. 10/639,702 dated Sep. 29, 2005.
Office action from U.S. Appl. No. 10/639,702 dated Jun. 1, 2005.
Office action from U.S. Appl. No. 10/639,702 dated Dec. 14, 2005.
Halliburton brochure entitled "HR®-5 Cement Additive" dated 1998.
Halliburton brochure entitled HR®-15 Cement Retarder dated 1999.
Fuller, George et al., "Deepwater Cementing Challenges—An Overview of Offshore Brazil, Gulf of Mexico, and West Africa", no date available.
Sanders, Tom et al., "Practices for Providing Zonal Isolation In Conjunction with Expandable Casing Jobs—Case Histories" dated 2003.
Owoeye, Oladele et al, "Use of Settable Spotting Fluid Improves Expandable Casing Process—Case History," SPE 77751, dated 2002.
Office action from U.S. Appl. No. 10/852,461 dated Jul. 5, 2006.

* cited by examiner

*Primary Examiner*—Paul Marcantoni
(74) *Attorney, Agent, or Firm*—Craig W. Roddy; Baker Botts, LLP

(57) ABSTRACT

Subterranean fluids comprising a hydraulic cement in an invert emulsion, and methods of using such fluids in subterranean well cementing operations, are provided. The fluids comprise a hydraulic cement and an invert emulsion of oil, water, and a surfactant. Optionally, other ingredients may be included in the fluids.

18 Claims, No Drawings

SUBTERRANEAN FLUIDS AND METHODS OF USING THESE FLUIDS IN SUBTERRANEAN FORMATIONS

CROSS-REFERENCE TO RELATED APPLICATIONS

This application is a divisional patent application of commonly-owned U.S. patent application Ser. No. 10/639,702, filed Aug. 12, 2003, now U.S. Pat. No. 7,147,056 entitled "Subterranean Fluids and Methods of Using These Fluids in Subterranean Formations," by Lance E. Brothers, which is incorporated by reference herein for all purposes.

BACKGROUND OF THE INVENTION

The present invention relates to subterranean fluids, and more particularly, to subterranean fluids comprising a hydraulic cement in an invert emulsion, and methods of using such fluids in subterranean operations.

During the drilling of a well bore in a subterranean formation, a drilling fluid may be circulated through a drill pipe and drill bit into the well bore, and subsequently flow upward through the well bore to the surface. The drilling fluid functions, inter alia, to cool the drill bit, lubricate the rotating drill pipe to prevent it from sticking to the walls of the well bore, prevent blowouts by providing hydrostatic pressure to counteract the sudden entrance into the well bore of high pressure formation fluids, and remove drilled cuttings from the well bore. While drilling fluids are not settable, e.g., they do not set into hard impermeable sealing masses when static, drilling fluids may increase in gel strength over time. Typically, after a well bore is drilled to a desired final depth, the drill pipe and drill bit are withdrawn from the well bore and the drilling fluid is left therein so as to, inter alia, provide hydrostatic pressure on permeable formations penetrated by the well bore, thereby preventing the flow of formation fluids into the well bore.

A common subsequent step in completing the well bore usually involves placing a pipe string, e.g., casing, into the well bore. Depending upon factors such as, inter alia, the depth of the well bore and any difficulties in placing the pipe string therein, the drilling fluid may remain relatively static in the well bore for an extended period of time, e.g., up to 2 weeks. During that time, the drilling fluid may progressively increase in gel strength whereby portions of the drilling fluid in the well bore may become increasingly difficult to displace.

Upon placement of the pipe string in the well bore, primary cementing is typically performed whereby the pipe string disposed in the well bore is cemented by pumping a cement composition through the pipe string and into an annulus between the pipe string and the walls of the well bore, thereby displacing the drilling fluid in the annulus. However, if the drilling fluid has developed sufficient gel strength during its residence within the well bore, an operator may be unable to displace all of the drilling fluid with the cement composition. Accordingly, portions of the drilling fluid in the well bore may be bypassed by the cement composition. This is problematic because the drilling fluid is generally not settable; therefore, formation fluids may enter and flow along the well bore, which is highly undesirable.

Operators have attempted to solve this problem by developing settable spotting fluid compositions, inter alia, to displace drilling fluids from well bores promptly after their use. However, these methods have not met with success, as conventional settable spotting fluids include blast furnace slag and other hydraulic components which may begin to set at relatively low temperatures, e.g., temperatures less than about 90° F. Also, certain slag-containing settable spotting fluids may be intolerant to cement composition contamination, causing the settable spotting fluids to cement prematurely upon contact with well cement. Counteracting this tendency to prematurely set, oftentimes a strong set retarder will be added to the spotting fluid, and the spotting fluid is often separated from the cement composition by a spacer fluid.

Conventional settable spotting fluids may also demonstrate other problems, including but not limited to undesirable instability as well as a general inability to develop significant compressive strength upon setting. For example, the invert emulsions found in most conventional settable spotting fluids typically become unstable within about one week after their formulation. This is problematic because it often necessitates formulating the invert emulsion shortly before placing the spotting fluid in a subterranean formation. If an excessive amount of the invert emulsion is formed, it generally cannot be re-used and is often disposed of, which disposal may further increase the cost of a particular job. Furthermore, the general inability of most conventional settable spotting fluids to develop significant compressive strength upon setting is also problematic, because, inter alia, where formation fluids are present under a pressure sufficient to overcome the settable spotting fluid's low compressive strength, such formation fluids may continue to enter and flow along the well bore, which is undesirable and defeats the major purpose of using settable spotting fluids—to provide zonal isolation.

SUMMARY OF THE INVENTION

The present invention relates to subterranean fluids, and more particularly, to subterranean fluids comprising a hydraulic cement in an invert emulsion, and methods of using such fluids in subterranean well cementing operations.

An example of a method of the present invention is a method of using a fluid in a subterranean formation comprising the step of introducing a fluid comprising a hydraulic cement and an invert emulsion of oil, water, and a surfactant into the formation.

An example of a composition of the present invention is a fluid comprising a hydraulic cement and an invert emulsion of oil, water, and a surfactant.

The features and advantages of the present invention will be readily apparent to those skilled in the art upon a reading of the description of the preferred embodiments which follows.

DETAILED DESCRIPTION OF EMBODIMENTS

The present invention relates to subterranean fluids, and more particularly, to subterranean fluids comprising a hydraulic cement in an invert emulsion, and methods of using such fluids in subterranean well cementing operations.

The subterranean well fluids of the present invention generally comprise an oil, water, an emulsifying surfactant for emulsifying the oil with water whereby an invert (e.g., oil-external) emulsion is formed, and a hydraulic cement. Other additives suitable for use in subterranean formations also may be added to these well fluids if desired. Generally, the invert emulsion is present in the well fluid in an amount in the range of from about 20% to about 60% by weight. In certain preferred embodiments, the invert emulsion is present in the well fluid in an amount in the range of from about 30% to about 55% by weight. Generally, the subterranean well fluids of the present invention have a density in the range of from about 11 to about 17 pounds per gallon.

Any oil may be used with the subterranean well fluids of the present invention. In certain preferred embodiments, the oil comprises one or more long chain hydrocarbons. A particularly suitable mixture of long chain hydrocarbons is commercially available under the trade designation "ESCAID 110™" from the ExxonMobil Corporation. Generally, the oil is present in the well fluid in an amount in the range of from about 40% to about 70% by volume of the invert emulsion. In certain preferred embodiments, the oil is present in the well fluid in an amount in the range of from about 45% to about 55% by volume of the invert emulsion.

The water used in the subterranean well fluids of the present invention may be fresh water, salt water (e.g., water containing one or more salts dissolved therein), brine (e.g., saturated salt water), or seawater. Generally, the water may be from any source provided that it does not contain an excess of compounds, e.g., dissolved inorganics, that may adversely affect other components in the cement composition. The water may be present in an amount sufficient to form a pumpable slurry. More particularly, the water is present in the well fluid in an amount in the range of from about 30% to about 60% by volume of the invert emulsion. In certain preferred embodiments, the water is present in the well fluid in an amount in the range of from about 45% to about 55% by volume of the invert emulsion.

A wide variety of emulsifying surfactants may be used in the well fluids of the present invention for emulsifying the oil with water. An example of a particularly suitable such emulsifying surfactant is a Tallow di-amine substituted with 3 moles of ethylene oxide which is available from Special Products, Inc., in Houston, Tex. Such emulsifying surfactant comprises about 60% active ingredient. Generally, the emulsifying surfactant may be present in the invert emulsion in an amount in the range of from about 5% to about 15% by weight of the oil. In certain preferred embodiments, the emulsifying surfactant may be present in the invert emulsion in an amount in the range of from about 7.5% to about 12% by weight of the oil.

Any hydraulic cement suitable for use in subterranean applications may be used in the present invention. In certain preferred embodiments, the hydraulic cement is a Portland cement. Generally, the hydraulic cement is present in the well fluids of the present invention in an amount in the range of from about 25% to about 60% by weight. In certain preferred embodiments, the hydraulic cement is present in the well fluids of the present invention in an amount in the range of from about 50% to about 60% by weight.

Alternatively, the hydraulic cement may comprise Class C or equivalent fly ash. As referred to herein, the term "fly ash" refers to the finely divided residue that results from the combustion of ground or powdered coal and is carried by the flue gases generated. ASTM Class C or equivalent fly ash contains both silica and calcium, and when mixed with water forms a cementitious mixture which sets into a hard impermeable mass, e.g., calcium silicate hydrate. In certain other embodiments, the hydraulic cement may comprise a source of calcium ion along with vitrified shale or Class F or equivalent fly ash. Where the hydraulic cement comprises vitrified shale or fly ash, the hydraulic cement is generally present in the well fluids of the present invention in an amount in the range of from about 50% to about 70% by weight; in certain preferred embodiments, the hydraulic cement may be present in an amount in the range of from about 55% to about 65% by weight. ASTM Class F fly ash does not contain a reactive form of calcium, and an external source of calcium ion is generally required for it to form a cementitious composition with water. Generally, hydrated lime may be mixed with Class F or the equivalent fly ash in an amount in the range of from about 5% to about 50% by weight of the fly ash. As referred to herein, the term "hydrated lime" will be understood to mean calcium hydroxide ($Ca(OH)_2$). Where fly ash is used as the hydraulic cement, certain preferred embodiments use ASTM Class F together with hydrated lime. Where the hydraulic cement comprises vitrified shale, a source of calcium ion is generally required for it to form a cementitious composition with water. Generally, hydrated lime may be used to provide the source of calcium ion. An example of a suitable vitrified shale is commercially available under the tradename "PRESSUR-SEAL® FINE LCM" from TXI Energy Services, Inc., in Houston, Tex. An example of a suitable hydrated lime is commercially available from Continental Lime, Inc., of Salt Lake City, Utah.

Optionally, the well fluids of the present invention may further comprise an oil viscosifier. Any known viscosifier that is compatible with an oil may be suitable for use in the well fluids of the present invention. An example of a suitable oil viscosifier is an organophilic clay commercially available under the tradename "CLAYTONE II" from Southern Clay Products, Inc., of Princeton, N.J. Generally, the oil viscosifier may be present in the well fluids of the present invention in an amount sufficient to provide a well fluid having a desired viscosity. More particularly, the oil viscosifier may be present in the well fluid in an amount in the range of from about 0.01% to about 2% by weight of the invert emulsion. In certain preferred embodiments, the oil viscosifier may be present in the well fluid in an amount in the range of from about 0.25% to about 0.6% by weight of the invert emulsion.

Optionally, the well fluids of the present invention may further comprise other additives as deemed appropriate by one skilled in the art with the benefit of this disclosure. Examples of such additives include, inter alia, fluid loss control additives, salts, fumed silica, set retarders, weighting agents, microspheres, defoaming agents, and the like. Examples of suitable set retarders are commercially available from Halliburton Energy Services, Inc., of Duncan, Ok., under the tradenames "HR®-5," and "HR®-15."

The well fluids of the present invention may be prepared in a variety of ways. Generally, the well fluids may be prepared by dispersing the surfactant into the oil, then adding water at low shear. The resulting mixture may then be subjected to high shear, inter alia, to form an emulsion. Afterwards, any dry blended materials such as the hydraulic cement may be added.

Among other benefits, the well fluids of the present invention do not significantly increase in gel strength over time, and are generally easily displaced after being static in the well bore for a long period of time, e.g., a time period of about one week or more. Among other benefits, the oil-external emulsion formed within the well fluids of the present invention is stable for a period of time up to about 3 weeks, thereby, inter alia, permitting the invert emulsion to be prepared as a separate component of the well fluid and sent to a job site far in advance of its use. The stability of the oil-external emulsion formed within the well fluids of the present invention, inter alia, may permit any unused portion of the invert emulsion to be returned, and re-used in a subsequent operation, without necessitating disposal.

In one embodiment, the well fluids of the present invention may be used to at least partially displace an oil-based drilling fluid resident within a well bore drilled to total depth where the oil-based drilling fluid has not yet gained significant gel strength. Displacement of the oil-based drilling fluid is achieved by the well fluids of the present invention because, inter alia, the oil-based drilling fluid has not had a chance to increase in static gel strength due to its constant circulation through equipment such as the drill pipe, drill bit, and pumps. Generally, the well fluids of the present invention may displace the oil-based drilling fluid to a level above those portions of the well bore containing fractures and other permeable areas or zones. After the well bore has been at least partially filled with a well fluid of the present invention, the pipe string to be cemented may be placed into the well bore. Some amount of oil-based drilling fluid may be present within the pipe string during this time. When the well cement composition is pumped through the pipe string into the annulus, it readily displaces the fluids within the pipe string and annulus. Any amount of the well fluids of the present invention which may remain in fractures or other permeable areas or zones in the well bore after the annulus has been filled with the well cement composition will ultimately set therein, due to, inter alia, the ability of the well fluids to develop compressive strength upon setting, thereby preventing the undesirable entry or flow of formation fluids in the annulus. In certain embodiments where the casing is subjected to an internal pressure test after the well cement composition has set-which pressure test could potentially crack a portion of the set well cement composition-such presence of a portion of the well fluids of the present invention post-cementing in fractures or other permeable areas within the well bore may permit such portion of the well fluid to flow into the cracks within the cement and set therein, thereby enhancing the integrity of the set well cement composition.

In another embodiment, the well fluids of the present invention may be used in connection with the installation of expandable casing. For example, expandable casing may be placed within a well bore comprising a well fluid of the present invention, after which the expandable casing may be expanded out, and the well fluid of the present invention may be permitted to set. Optionally, a cementing plug may be displaced into the casing so as, inter alia, to displace the portion of the well fluid resident within the casing before the well fluid sets. Alternatively, after permitting the well fluid of the present invention to set, the portion of the well fluid within the casing may be drilled out.

While a number of preferred embodiments described herein relate to subterranean well cementing, it is understood that other well treatment fluids, including but not limited to spacer fluids, may also be prepared according to the present invention. As referred to herein, the term "spacer fluid" will be understood to mean a fluid placed within a well bore to separate fluids, e.g., to separate a drilling fluid within the well bore from a cement composition that will subsequently be placed within the well bore. Accordingly, an example of a method of the present invention is a method for using a fluid in a subterranean formation comprising the step of: introducing a fluid comprising a hydraulic cement and an invert emulsion of oil, water, and a surfactant into the formation.

An example of a fluid composition of the present invention comprises: 108 grams of long chain hydrocarbons, 12 grams of surfactant comprising a Tallow di-amine substituted with 3 moles of ethylene oxide, 90 grams of water, 300 grams vitrified shale, 50 grams calcium hydroxide ($Ca(OH)_2$), and 2.45 grams of set retarder.

To facilitate a better understanding of the present invention, the following examples of some of the preferred embodiments are given. In no way should such examples be read to limit the scope of the invention.

EXAMPLE 1

Rheological testing was performed on sample of various fluids, in order to compare the compatibility of the well fluids of the present invention with oil-based drilling fluids. The testing was performed at 140° F. per API Recommended Practice 10B.

Sample Composition No. 1 is a well fluid of the present invention, and was prepared by first adding 12 grams of a Tallow di-amine substituted with 3 moles of ethylene oxide to 108 grams of a C11-C15 saturated hydrocarbon oil. Then, 90 grams of water were added at low shear. The resulting mixture was then sheared at 12,000 rpm for 2 minutes on a Waring blender to form an oil external emulsion. Next, 350 grams of Portland Class A cement, 3 grams of HR®-15 cement retarder, and 2.16 grams of an organophilic clay were added to form the oil external cement slurry that comprises Sample Composition No. 1.

Sample Composition No. 2 comprises 75% of an invert emulsion drilling fluid and 25% of a well fluid of the present invention (having the same composition as Sample Composition No. 1) by volume.

Sample Composition No. 3 comprises 50% of an invert emulsion drilling fluid and 50% of a well fluid of the present invention (having the same composition as Sample Composition No. 1) by volume.

Sample Composition No. 4 comprises a mixture of Class A cement, 0.57% set retarder by weight of the cement, and 5.2 gallon water per sack cement ("gal/sk").

Sample Composition No. 5 comprises an invert emulsion drilling fluid.

Sample Composition No. 6 comprises 75% of an invert emulsion drilling fluid and 25% of an aqueous-based cement composition (having the same composition as Sample Composition No. 4) by volume.

Sample Composition No. 7 comprises 50% of an invert emulsion drilling fluid and 50% of an aqueous-based cement composition (having the same composition as Sample Composition No. 4) by volume.

The results are set forth in Table 1 below.

TABLE 1

| Sample Fluid | Plastic Viscosity (cP) | Yield Point (lb/100 ft$^2$) |
| --- | --- | --- |
| Sample Composition No. 1 | 63 | 7 |
| Sample Composition No. 2 | 30 | 5 |
| Sample Composition No. 3 | 33 | 5 |
| Sample Composition No. 4 | 7.5 | 3.5 |
| Sample Composition No. 5 | 27 | 10 |
| Sample Composition No. 6 | 60 | 34 |
| Sample Composition No. 7 | 168 | 52 |

Accordingly, the above example demonstrates that the well fluids of the present invention are compatible with conventional oil-based drilling fluids, and that the addition of the well fluids of the present invention to such oil-based drilling fluids caused no appreciable increase in gelation or viscosity. The above example also illustrates the relative incompatibility of conventional oil-based drilling fluids and conventional aqueous-based cement compositions, as may be seen from the elevated yield points of Sample Composition Nos. 6 and 7.

EXAMPLE 2

Static gel strength testing was conducted on well fluids of the present invention. A fluid was prepared comprising 108 grams of ESCAID 110™ oil, 12 grams of surfactant comprising a Tallow di-amine substituted with 3 moles of ethylene oxide, 135 grams of water, 250 grams Class A cement, and 2.16 grams CLAYTONE II oil viscosifier. Sample Compositions were prepared from this fluid by adding varying amounts of HR®-5 set retarder.

Sample Composition No. 8 comprises the fluid plus 0.6% HR®-5 by weight of cement.

Sample Composition No. 9 comprises the fluid plus 0.7% HR®-5 by weight of cement.

Sample Composition No. 10 comprises the fluid plus 0.8% HR®-5 by weight of cement.

Sample Composition No. 11 comprises the fluid plus 0.9% HR®-5 by weight of cement.

Static gel strength testing was performed at 140° F. per API Recommended Practice 13 B-2 (2d. ed., Dec. 1, 1991). The results are set forth in the table below.

TABLE 2

| Sample Fluid | Static Gel Strength Development (lb/100 ft$^2$) | | | | Set Time (days) | Set Strength (psi) |
| --- | --- | --- | --- | --- | --- | --- |
| | Day 1 | Day 2 | Day 3 | Day 4 | | |
| Sample Composition No. 8 | 0 | ND | ND | SET | 4 | 115 |
| Sample Composition No. 9 | 15 | ND | ND | SET | 4 | 81 |
| Sample Composition No. 10 | 0 | 0 | 13 | 1,200 | 5-6 | 116 |
| Sample Composition No. 11 | 0 | 18 | 28 | 40 | 5-6 | 86 |

In the above table, "ND" means that a value was not determined for a particular sample on the day indicated. "SET" means that the sample composition set on the day indicated. The above example demonstrates, inter alia, that the well fluids of the present invention maintain a low static gel strength prior to developing compressive strength.

EXAMPLE 3

An additional portion of Sample Composition No. 10 was formulated and subjected to static gel strength testing at 160° F. per API Recommended Practice 13 B-2 (2d. ed., Dec. 1, 1991). The results are set forth in the table below.

TABLE 3

| Sample Fluid | Static Gel Strength Development (lb/100 ft$^2$) | | | | Set Time (days) | Set Strength (psi) |
| --- | --- | --- | --- | --- | --- | --- |
| | Day 1 | Day 2 | Day 3 | Day 4 | | |
| Sample Composition No. 10 | 37 | 45 | ND | ND | 3-4 | 42 |

In the above table, "ND" means that a value was not determined for a particular sample on the day indicated. The above example demonstrates, inter alia, that the well fluids of the present invention maintain a low static gel strength prior to developing compressive strength.

EXAMPLE 4

Further static gel strength testing was conducted on well fluids of the present invention. Sample Composition No. 12 was prepared comprising 108 grams of ESCAID 110™ oil, 12 grams of surfactant comprising a Tallow di-amine substituted with 3 moles of ethylene oxide, 90 grams of water, 300 grams vitrified shale, 50 grams calcium hydroxide (Ca(OH)$_2$), and 2.45 grams of HR®-5 set retarder. Sample Composition No. 12 was subjected to testing at 160° F. per API Recommended Practice 13 B-2 (2d. ed., Dec. 1, 1991). The results are set forth in the table below.

TABLE 4

| Sample Fluid | Static Gel Strength Development (lb/100 ft$^2$) | | | | | Set Time (days) | Set Strength (psi) |
| --- | --- | --- | --- | --- | --- | --- | --- |
| | Day 1 | Day 2 | Day 3 | Day 6 | Day 7 | | |
| Sample Composition No. 12 | 120 | 160 | 280 | 300 | 500 | 9 | 175 |

The above example demonstrates, inter alia, that the embodiments of the well fluids of the present invention which comprise vitrified shale and calcium hydroxide maintain a low static gel strength prior to developing compressive strength.

EXAMPLE 5

Additional static gel strength testing was performed on well fluids of the present invention. A fluid was prepared comprising 108 grams of ESCAID 110™ oil, 12 grams of surfactant comprising a Tallow di-amine substituted with 3 moles of ethylene oxide, 135 grams of water, 300 grams vitrified shale, 50 grams calcium hydroxide (Ca(OH)$_2$), and varying amounts of HR®-5 set retarder.

Sample Composition No. 13 comprises the fluid described immediately above plus 0.5% HR®-5 set retarder by weight.

Sample Composition No. 14 comprises the fluid described immediately above plus 0.6% HR®-5 set retarder by weight. The sample compositions were subjected to testing at 160° F. per API Recommended Practice 13 B-2 (2d. ed., Dec. 1, 1991). The results are set forth in the table below.

TABLE 5

| Sample Fluid | Static Gel Strength Development (lb/100 ft$^2$) | | | | | Set Time (days) | Set Strength (psi) |
| --- | --- | --- | --- | --- | --- | --- | --- |
| | Day 1 | Day 2 | Day 3 | Day 4 | Day 5 | | |
| Sample Composition No. 13 | 30 | ND | ND | 320 | SET | 5 | 166 |
| Sample Composition No. 14 | 40 | ND | ND | 130 | 100 | 8 | 226 |

In the above table, "ND" means that a value was not determined for a particular sample on the day indicated. "SET" means that the sample composition set on the day indicated. The above example demonstrates, inter alia, that the well fluids of the present invention maintain a low static gel strength prior to developing compressive strength.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A fluid comprising a hydraulic cement and an invert emulsion of oil, water, and an emulsifying surfactant, that comprises a Tallow di-amine substituted with 3 moles of ethylene oxide.

2. The fluid of claim 1 wherein the invert emulsion is present in the fluid in an amount in the range of from about 20% to about 60% by weight.

3. The fluid of claim 1 having a density in the range of from about 11 to about 17 pounds per gallon.

4. The fluid of claim 1 wherein the oil comprises a hydrocarbon that comprises at least about 11 carbon atoms.

5. The fluid of claim 1 wherein the oil is present in the fluid in an amount in the range of from about 40% to about 70% by volume of the invert emulsion.

6. The fluid of claim 1 wherein the water is present in an amount sufficient to form a pumpable slurry.

7. The fluid of claim 6 wherein the water is present in an amount in the range of from about 30% to about 60% by volume of the invert emulsion.

8. The fluid of claim 1 wherein the emulsifying surfactant is present in the fluid in an amount in the range of from about 5% to about 15% by weight of the oil.

9. The fluid of claim 1 wherein the emulsifying surfactant comprises about 60% of the Tallow di-amine substituted with 3 moles of ethylene oxide.

10. The fluid of claim 1 wherein the hydraulic cement is present in an amount in the range of from about 25% to about 60% by weight of the fluid.

11. The fluid of claim 10 wherein the hydraulic cement comprises a Portland cement.

12. The fluid of claim 1 wherein the hydraulic cement comprises at least one hydraulic cement selected from the group consisting of: an ASTM Class C fly ash, a mixture of ASTM Class F fly ash and hydrated lime, a mixture of vitrified shale and hydrated lime, and any mixture thereof.

13. The fluid of claim 12 wherein the hydraulic cement is present in an amount in the range of from about 50% to about 70% by weight of the fluid.

14. The fluid of claim 1 further comprising an oil viscosifier.

15. The fluid of claim 14 wherein the oil viscosifier is an organophilic clay.

16. The fluid of claim 1 wherein the oil viscosifier is present in an amount sufficient to provide a fluid having a effective viscosity.

17. The fluid of claim 16 wherein the oil viscosifier is present in an amount in the range of from about 0.01% to about 2% by weight of the invert emulsion.

18. The fluid of claim 1 having a density in the range of from about 11 to about 17 pounds per gallon; wherein the surfactant comprises an emulsifying surfactant comprising a Tallow di-amine substituted with 3 moles of ethylene oxide; wherein the surfactant is present in the fluid in an amount in the range of from about 5% to about 15% by weight of the oil; wherein the invert emulsion is present in the fluid in an amount in the range of from about 20% to about 60% by weight; wherein the oil comprises a long chain hydrocarbon and is present in the fluid in an amount in the range of from about 40% to about 70% by volume of the invert emulsion; and wherein the water is present in an amount in the range of from about 30% to about 60% by volume of the invert emulsion.

* * * * *